(12) United States Patent
Cheung et al.

(10) Patent No.: US 7,372,820 B1
(45) Date of Patent: May 13, 2008

(54) SYSTEM AND METHOD FOR STRIPING DELAY-SENSITIVE DATA OVER MULTIPLE BURSTY CHANNELS

(75) Inventors: Gene Cheung, Tokyo (JP); Puneet Sharma, Palo Alto, CA (US); Sung-Ju Lee, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 620 days.

(21) Appl. No.: 10/977,147

(22) Filed: Oct. 29, 2004

(51) Int. Cl.
*H04J 1/16* (2006.01)
*H04J 3/16* (2006.01)
(52) U.S. Cl. ...................... 370/252; 370/465
(58) Field of Classification Search ............ None
See application file for complete search history.

(56) References Cited

U.S. PATENT DOCUMENTS

| | | | | |
|---|---|---|---|---|
| 5,491,695 A | * | 2/1996 | Meagher et al. | 370/260 |
| 5,757,804 A | * | 5/1998 | McGee | 370/510 |
| 6,198,749 B1 | * | 3/2001 | Hui et al. | 370/463 |
| 7,024,196 B1 | * | 4/2006 | Kotzin | 455/445 |
| 7,181,170 B2 | * | 2/2007 | Love et al. | 455/67.13 |
| 2002/0197998 A1 | * | 12/2002 | Schmidt | 455/452 |
| 2005/0022247 A1 | * | 1/2005 | Bitran et al. | 725/111 |
| 2006/0039312 A1 | * | 2/2006 | Walton et al. | 370/319 |
| 2006/0093067 A1 | * | 5/2006 | Jalali et al. | 375/299 |
| 2006/0176861 A1 | * | 8/2006 | Schmidt | 370/337 |

* cited by examiner

*Primary Examiner*—Andrew C. Lee (57) ABSTRACT

Embodiments of the present invention include a method for striping data comprising accessing data to be striped over a plurality of wireless channels, accessing time sensitivity information associated with the data and mapping the data to the plurality of wireless channels wherein the time sensitivity information is used determine the mapping. The method further includes striping the data over the plurality of wireless channels.

17 Claims, 8 Drawing Sheets

SYSTEM AND METHOD FOR STRIPING DELAY-SENSITIVE DATA OVER MULTIPLE BURSTY CHANNELS

FIELD OF THE INVENTION

The present invention relates to the field of wireless communications. Specifically, embodiments of the present invention relate to striping delay sensitive packets over multiple wireless channels.

BACKGROUND OF THE INVENTION

Wireless technologies and services have enabled users to connect to a network (e.g., Internet) without cables, with devices such as laptops, (Personal Digital Assistants) PDAs, and cellular phones. Today, mobile devices have multiple wireless communication interfaces (e.g., multi-homed). A wireless device can connect to the Internet on a wireless wide area network (WWAN) interface, such as a cellular link. Although this type of interface provides long-range service, the bandwidth is quite limited.

A multi-homed device can also connect to the Internet using a high-speed, short ranged wireless local area network (WLAN) interface such as IEEE 802.11. With this setting of bandwidth mismatch between WWAN and WLAN interfaces, multiple devices and/or multiple users connected to each other in a local area wireless network can "aggregate" their low speed WAN channels to form a high-speed logical WAN link. Such channel aggregation can enable services such as rich-media streaming which would be difficult on a single WAN channel. The aggregation is achieved by using an inverse multiplexing technique such as striping. Striping over wireless channels presents a challenge because of bursty losses and location dependent errors inherent to wireless channels.

SUMMARY OF THE INVENTION

Embodiments of the present invention include a method for striping data comprising accessing data to be striped over a plurality of wireless channels, accessing time sensitivity information associated with the data and mapping the data to the plurality of wireless channels wherein the time sensitivity information is used to determine the mapping. The method further includes striping the data over the plurality of wireless channels.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Reference will now be made in detail to embodiments of the present invention, a system and method for striping data, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Wireless mobile multi-homed devices have multiple wireless communication interfaces. A mobile device connects to the Internet via a long range, low speed wide area network (WAN) such as a cellular link, and communicates with nearby devices through a short range, high-speed local area network (LAN) such as an IEEE802.11 network. To utilize the multiple low bandwidth wireless communication interfaces of these multi-homed devices, striping (inverse multiplexing) can be used.

One embodiment of the present invention models and analyzes the striping of delay-sensitive streaming data over a plurality of bursty wireless channels. In one embodiment of the invention, a two-state Markov chain is used to model the bursty errors. From that, an expected packet loss ratio can be determined when forward error correction and retransmissions are used for error protection. In one embodiment of the invention, redundancies of the data are striped according to the expected packet loss ratio. In another embodiment of the invention, the expected packet loss ratio for each of the wireless channels determines the mapping of the data to the different channels.

Embodiments of the invention also model and analyze striping when bursty error channels are limited in bandwidth. Embodiments of the present invention optimally stripe time-sensitive data packets over a plurality of bursty wireless channels when automatic repeat request (ARQ) and forward error correction (FEC) is used for error correction.

Figure 1:
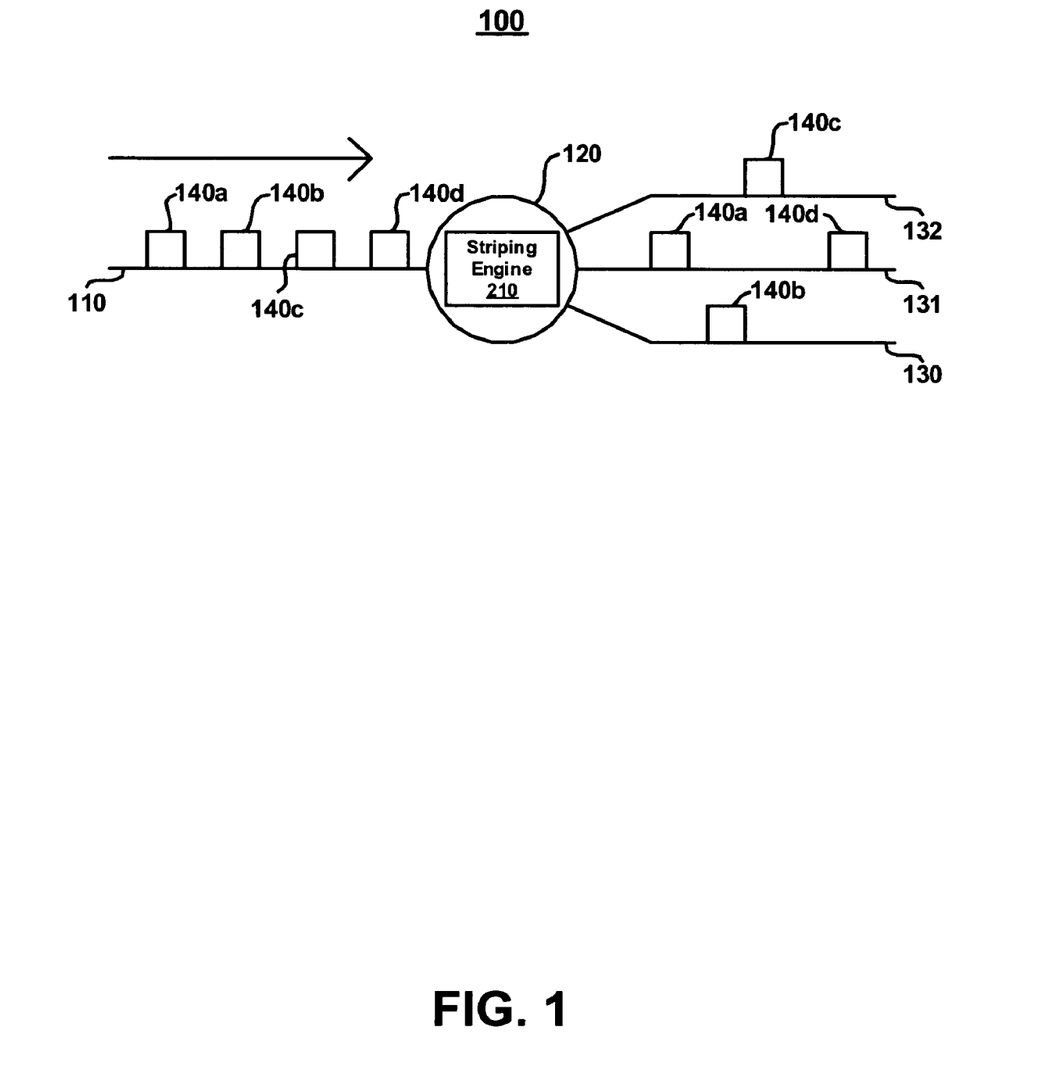
FIG. 1 is a block diagram of an exemplary system for striping data over a plurality of channels in accordance with embodiments of the present invention.

FIG. 1 is a block diagram of an exemplary system 100 for striping data over a plurality of channels in accordance with embodiments of the present invention. Striping is the mapping of a single data flow 110 to many transmission channels (e.g., channels 130, 131 and 132). Data packets 140a, 140b, 140c, and 140d are accessed from flow 110 and transmitted over a plurality of channels by transmitter 120.

In one embodiment of the invention, the transmitter comprises a striping engine 210 that examines the data packets 140a, 140b, 140c, and 140d and time sensitivity information is identified. An example of time sensitive data is streaming video data. Streaming video data is time sensitive because if a video frame arrives after it playback deadline, it is useless. In the case of streaming video data, it is important to receive the data on time (before it is to be displayed). It is appreciated that time sensitive information is any information that is useless after a predetermined time. In one embodiment of the invention, time sensitive information has a deadline associated with it that determines the time after which the data is no longer useful.

In one embodiment, it can be determined that the data to be striped is time sensitive and data independent. An example of time critical and data independent data is pulse-coding modulation (PCM) streaming audio data or motion (joint photographic experts group) JPEG streaming video data.

In another embodiment of the invention, it can also be determined that the data packets 140 are, for example, time sensitive and data dependent. For example, time sensitive and data dependent data can include layered streaming video data, motion-compensated streaming data or any other time critical and data dependent data. It is appreciated that data dependent data is any stream of data that is dependent on other data in the stream.

Time sensitive data packets are useless past a certain deadline and embodiments of the present invention map the data packets to the plurality of channels according to their respective deadline. After mapping, the data packets are then transmitted on the channels they are mapped to. In one embodiment of the invention, the data packets are transmitted over a plurality of wireless channels. In this embodiment of the invention, one or more of the wireless channels is bursty.

Figure 2:
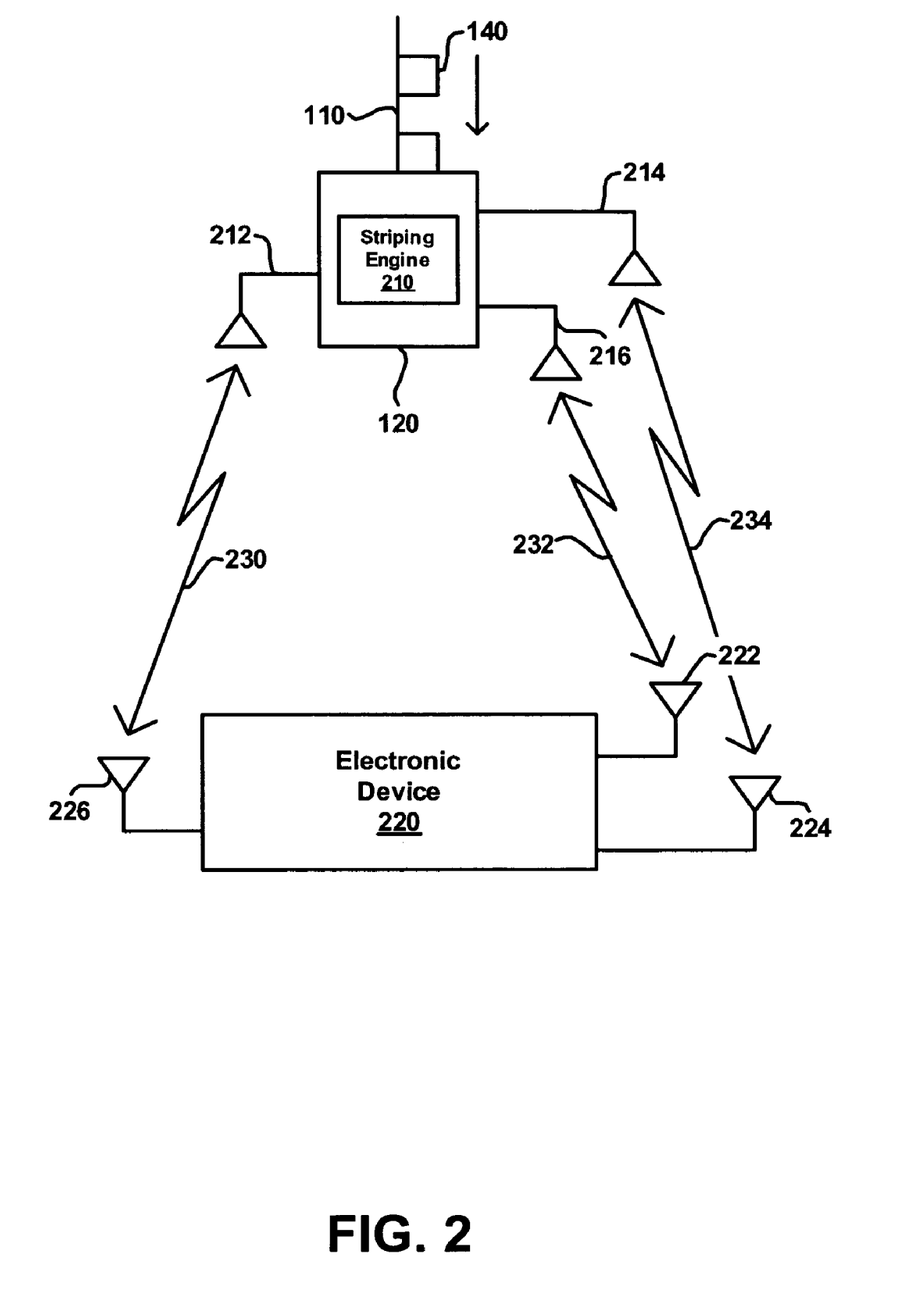
FIG. 2 is a block diagram of a wireless communication environment in accordance with embodiments of the present invention.

FIG. 2 is a block diagram of a wireless communication environment in accordance with embodiments of the present invention. Embodiments of the present invention aggregate multiple low bandwidth wireless channels to provide a higher bandwidth collaborative connection. For example, a higher bandwidth channel is formed by combining the bandwidth of wireless channels 230, 232, and 234.

In accordance with embodiments of the present invention, an electronic device 220 can communicate over a plurality of wireless channels with a wireless transmitter 120. Specifically, electronic device 220 comprises a plurality of wireless WAN communication interfaces. The electronic device 220 can combine the bandwidth of each of the communication interfaces to increase overall bandwidth of the device. It is appreciated that each of the communication interfaces may use a different communications standard. For example, one may use (General Packet Radio Service) GPRS, and another may use a (Cellular Digital Packet Data) CDPD or any other wireless WAN communications standard in accordance with the present invention.

Electronic device 220 can be any electronic device capable of wireless communications. In one embodiment of the invention, wireless device 220 is a laptop computer system. The present invention is however well suited to use various other electronic devices such as but not limited to a cellular telephone, or a personal digital assistant computer system.

Electronic device 220 communicates with wireless transmitter 120 over a plurality of wireless channels 230, 232, and 234. The wireless transmitter comprises transmitters/receivers 216, 214, and 212 that communicate wirelessly with transmitters/receivers 222, 224, and 226 respectively of electronic device 220. It is appreciated that a transmitter/receiver of the electronic device 220 communicates with a transmitter/receiver of the wireless transmitter that uses the same wireless protocol. For example, suppose transmitter 226 uses GPRS for data communications. In this example, transmitter/receiver 212 would also use GPRS for data communications.

Data packets 140 enter the wireless transmitter 120 on channel 110. Channel 110 can be a wired channel or a wireless channel. A striping engine 210 maps the data packets 140 to the plurality of wireless channels available. In one embodiment of the invention, the striping engine identifies time sensitivity information associated with the data packets and uses the time sensitivity information to map the data packets to the plurality of wireless channels. The Time-sensitivity information could include a deadline or expiration time. For example, the striping engine can identify time-sensitive data such as streaming video data. Once identified as time-sensitive, the striping engine can stripe the packets 140 such that they arrive before they are no longer useful. This is important when the wireless channels are different bandwidths and packets may be transmitted out of order.

Figure 3:
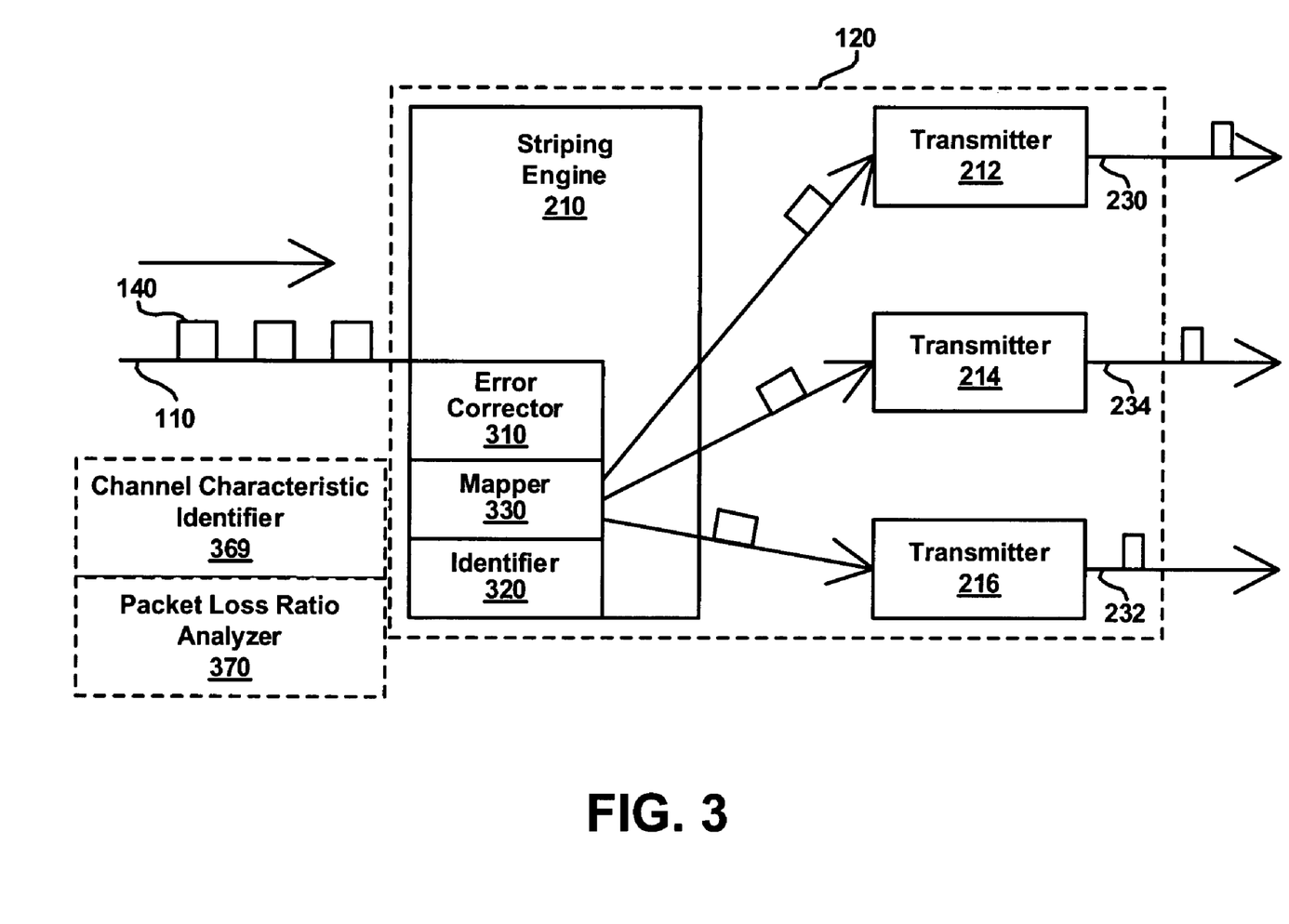
FIG. 3 is a block diagram of an exemplary striping engine for mapping data to a plurality of wireless channels in accordance with embodiments of the present invention.

FIG. 3 is a block diagram of an exemplary striping engine for mapping data to a plurality of wireless channels in accordance with embodiments of the present invention. Striping engine 210 accesses packets 140 from an input 110. A mapper 330 communicatively coupled to the striping engine 210 maps the packets 140 to a plurality of wireless transmitters 212, 214, and 216. In one embodiment of the invention, the wireless transmitters and the striping engine 210 are coupled inside of a wireless aggregation proxy 120. However, it is appreciated that the components of the striping engine 210 and the wireless transmitters 212, 214, and 216 can reside as separate units. It is also appreciated that the components of the striping (e.g., mapper 330, identifier 320, channel characteristic identifier 369, and packet loss ratio analyzer 370) can reside inside the striping engine 210 or can reside as separate devices.

In one embodiment of the invention, the mapper 330 determines a number of mappings and chooses the best mapping according to data such as channel characteristics. The process of determining the number of mappings is described below in Section II entitled "Striping Forward Error Correction (FEC) Data."

In one embodiment of the invention, the mapper 330 maps the packets according to time sensitivity information of the data packets to be striped. This embodiment of the invention is described in more detail in section III entitled "Delay-Sensitive Traffic Over Bandwidth-Limited Channels." An identifier 320 is coupled to the striping engine 210 to identify the time sensitivity information. In one embodiment of the invention, the time sensitivity information is identified directly from the data packets 140, for example, in the header portion of the packet. In another embodiment of the invention, the time sensitivity information is retrieved from another source, for example, the sender of the packets. Once the packets are mapped, they are transmitted over a plurality of wireless channels 230, 232, and 234.

In one embodiment of the invention, an optional channel characteristic identifier 369 is communicatively coupled to the mapper 330. The channel characteristic identifier 369 determines channel characteristics of the plurality of wireless channels. Channel characteristics can include packet loss ratio, burst length, channel bandwidth, or any other channel characteristic in accordance with embodiments of the present invention. Details on mapping packets according to channel characteristics are described below in Section I entitled "Forward Error Correction for Bursty Channels."

In another embodiment of the invention, an optional packet loss ratio analyzer 370 is communicatively coupled to the mapper 330. In one embodiment of the invention, an optimized mapping is determined by analyzing channel characteristics including the packet loss ratio for the plurality of wireless channels. Details on analyzing the channel characteristics including packet loss ratios are provided below in section I.

In one embodiment of the invention the wireless channels are bursty. The bursty nature of the wireless channels introduces errors in the transmission of the packets. To help reduce the effect of the bursty errors of the wireless channels, an error corrector 310 is used. In one embodiment of the invention, the error corrector 310 models the error and corrects the error by using, for example, forward error correction (FEC). The details of determining error and correcting error will be described below in section II entitled "Striping Forward Error Correction (FEC) Data."

Figure 4:
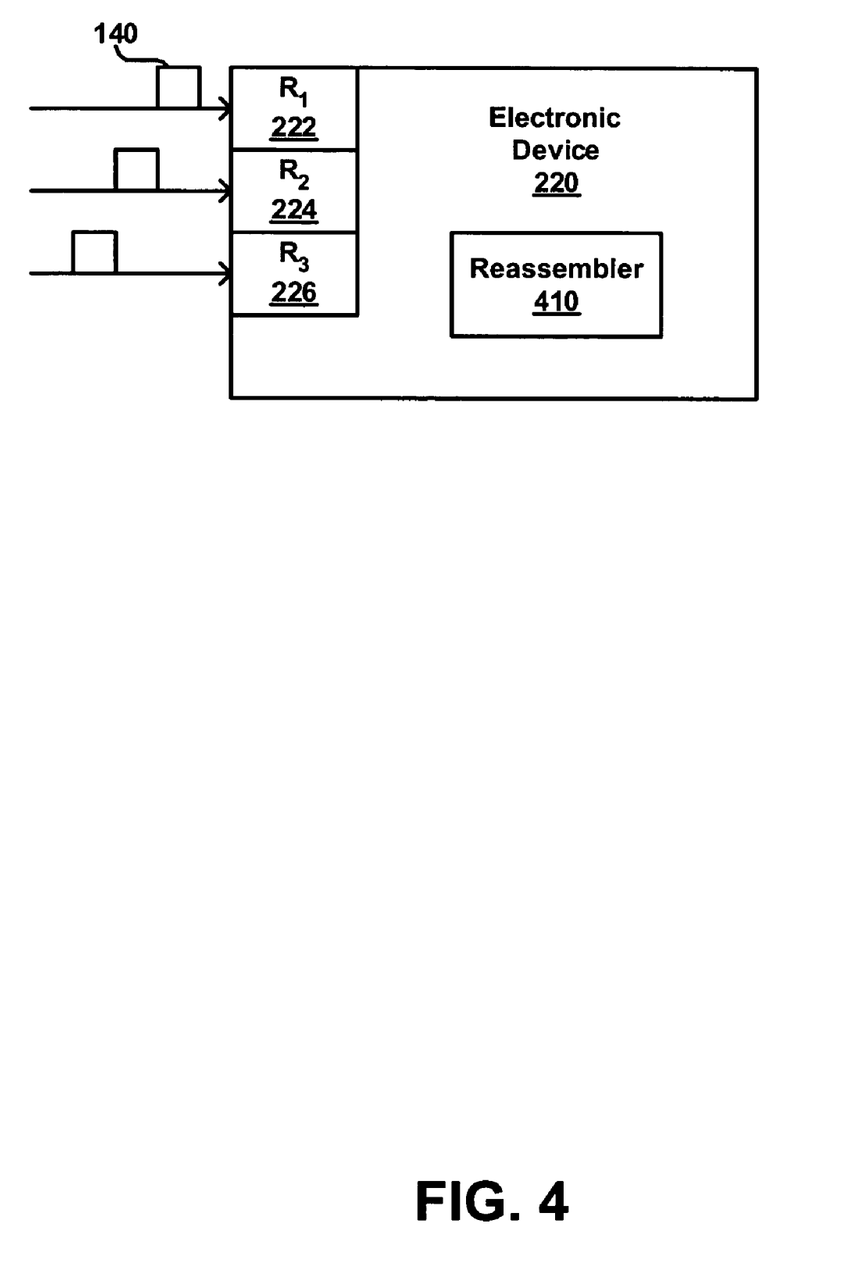
FIG. 4 is a block diagram of an exemplary electronic device that can simultaneously receive data packets over a plurality of wireless channels in accordance with embodiments of the present invention.

FIG. 4 is a block diagram of an exemplary electronic device that can receive data packets over a plurality of wireless channels in accordance with embodiments of the present invention. Electronic device 220 comprises a plurality of receivers 222, 224 and 226. In one embodiment of the invention, the packets 140 are received out of order. In this embodiment of the invention, a reassembler 410 is used to arrange the packets in the correct sequence. Although, in one embodiment of the invention, a single device is shown to have multiple wireless receiving interfaces, it is appreciated that multiple devices can be used to aggregate WWAN bandwidth.

Figure 5:
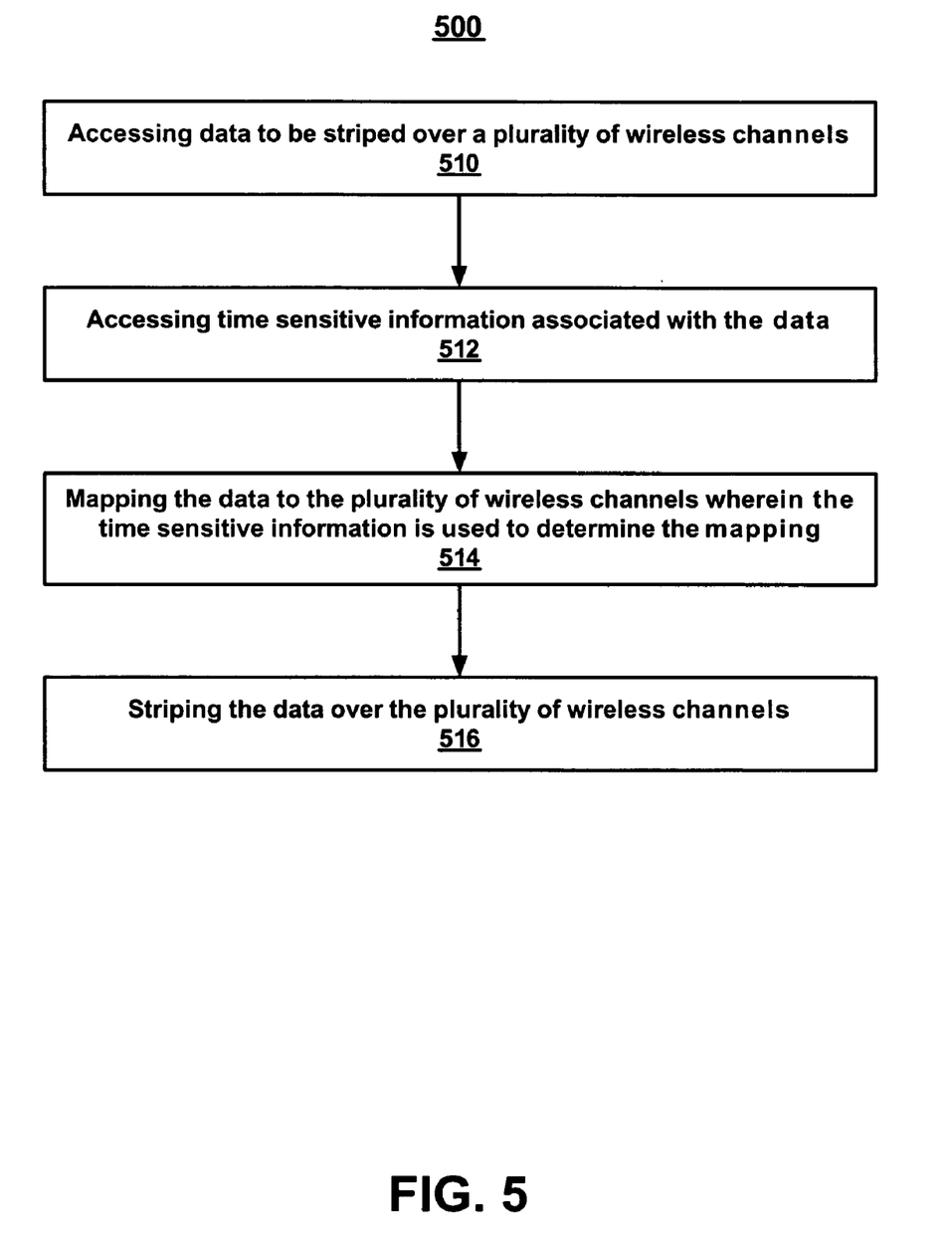
FIG. 5 is a flow diagram of an exemplary method for striping time-sensitive data over a plurality of wireless channels in accordance with embodiments of the present invention.

FIG. 5 is a flow diagram of an exemplary method 500 for striping time-sensitive data over a plurality of wireless channels in accordance with embodiments of the present invention. For clarity, the optional steps of exemplary process 500 that are presented in FIGS. 6 and 7 will discussed in conjunction with FIG. 5. Section III below, entitled "Delay-Sensitive Traffic Over Bandwidth-Limited Channels," further describes the exemplary method for striping time-sensitive data over a plurality of wireless channels.

At step 510, the present embodiment of the invention accesses data to be striped over a plurality of wireless channels. In one embodiment of the invention, the data is accesses from a wired connection. However, in another embodiment of the invention, the data to be striped is accessed from a wireless channel.

At step 512, the present embodiment of the invention accesses time sensitivity information associated with the data to be striped. In one embodiment of the invention, the data to be striped comprises header information that includes time sensitivity information. It is appreciated that the time sensitivity information can be accessed from a plurality of sources, for example, from a server system.

Figure 6:
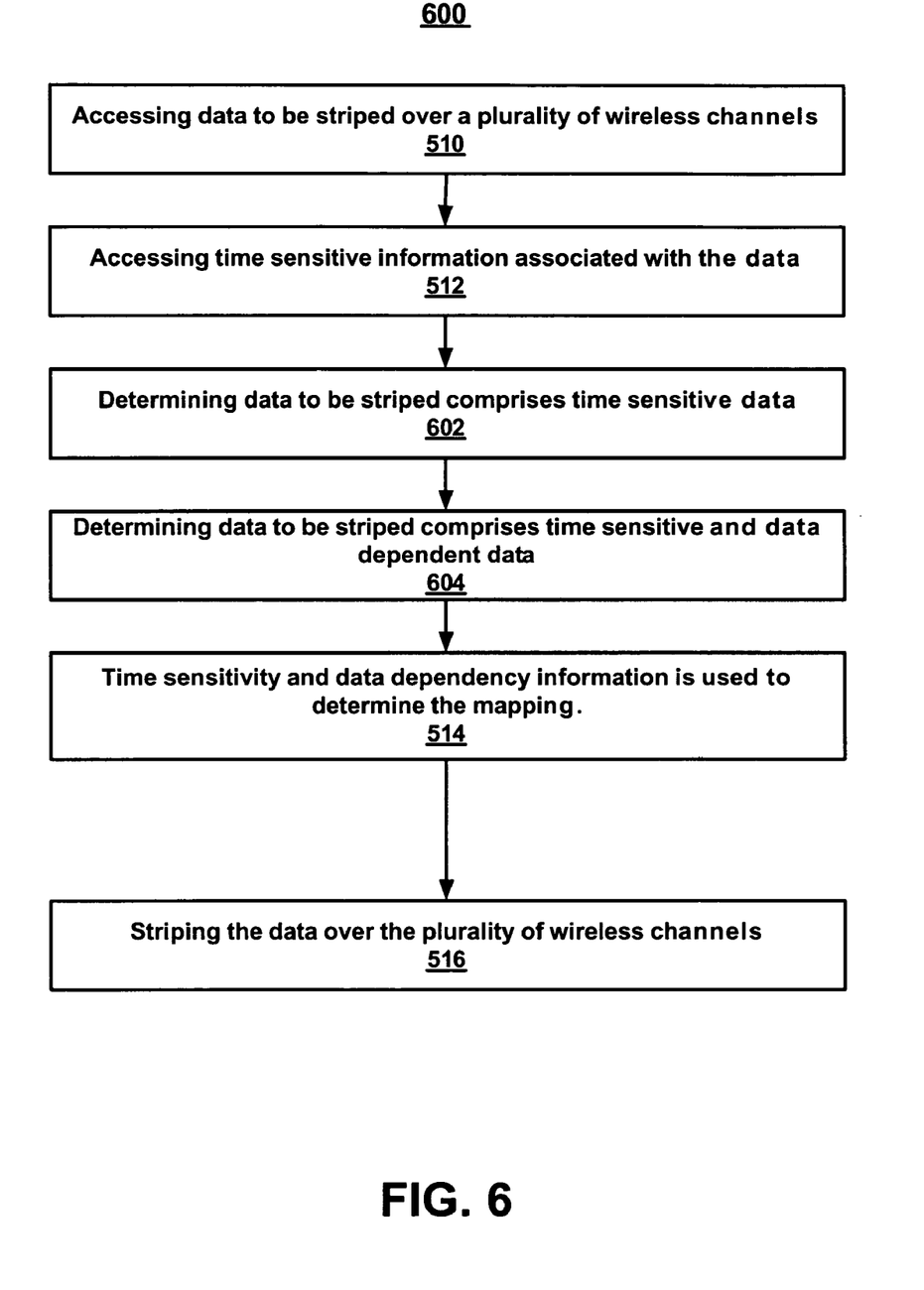
FIG. 6 is a flow diagram of an exemplary method for striping time-sensitive data over a plurality of wireless channels including determining time sensitive data in accordance with embodiments of the present invention.

In one embodiment of the invention, step 602 of FIG. 6, the present invention determines that the data to be striped comprises time sensitive data. In one embodiment of the invention, time sensitive data comprises a deadline for which the data must be delivered before it is rendered useless.

At step 604 of FIG. 6, the present invention determines the data to be striped comprises time sensitive and data dependent data. An example of time sensitive and data dependent data is layered video streaming data or motion-compensated streaming video data. It is appreciated that the present invention is also well suited to many other types of time sensitive and data dependent data. Section IIIa below further describes striping data dependent packets over a plurality of bursty channels.

In another embodiment of the invention, it is determined that the data to be striped is time sensitive and data independent. An example of time sensitive and data independent data is PCM streaming audio or motion JPEG streaming video. Section IIIb below further describes striping data dependent packets over a plurality of bursty channels.

Figure 7:
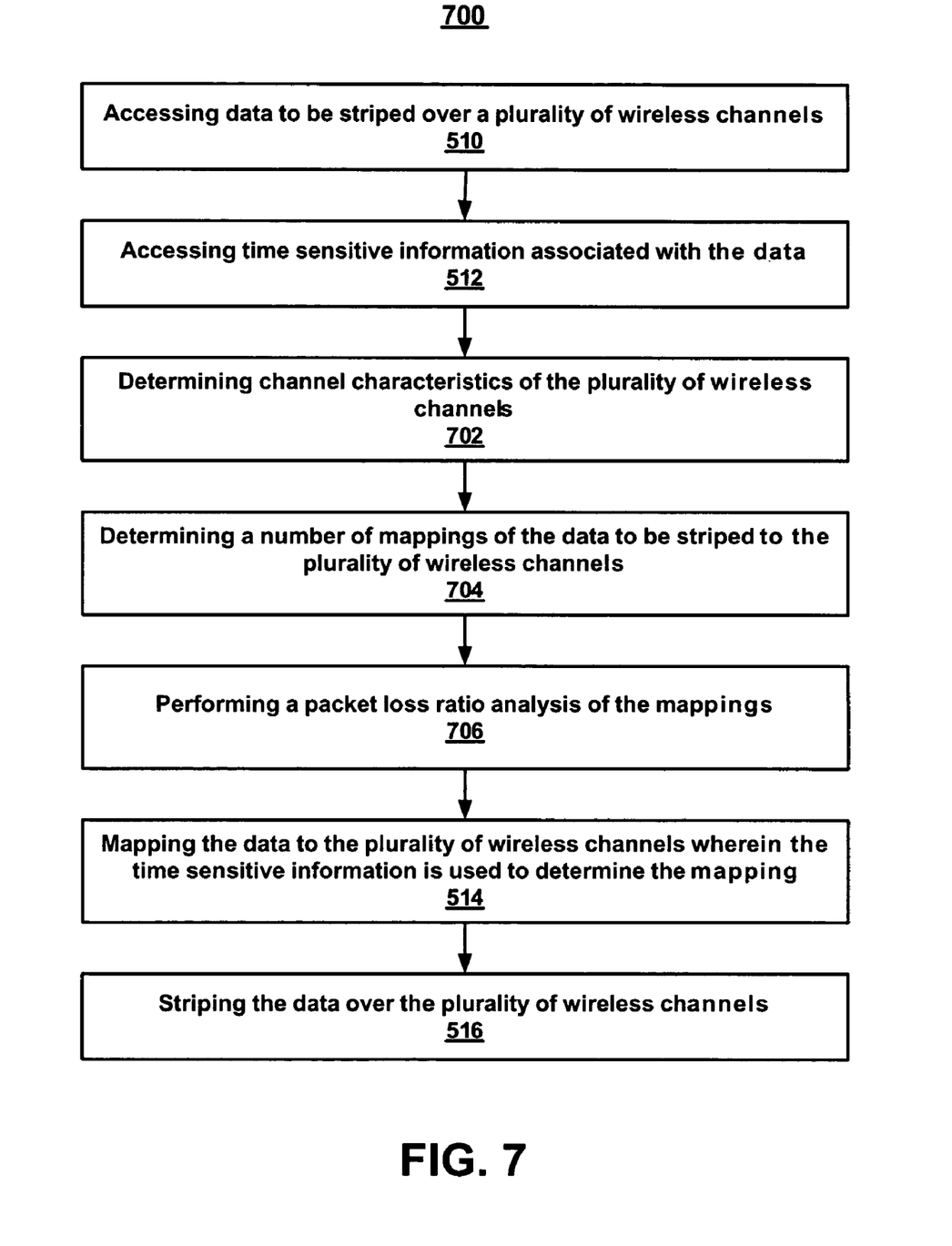
FIG. 7 is a flow diagram of an exemplary method for striping time-sensitive data over a plurality of wireless channels including determining a number of mappings in accordance with embodiments of the present invention.

At step 702 of FIG. 7, the present invention determines channel characteristics of the plurality of wireless channels. In one embodiment, the present invention determines a bandwidth for each of the plurality of wireless channels. In another embodiment, the present invention determines a probability that a packet will be transmitted without error.

At step 706 of FIG. 7, the present invention performs a packet loss ratio analysis of the mappings determined in step 704. In one embodiment of the invention, an optimal mapping is determined based on the packet loss ratio analysis performed in step 706.

At step 514, the present embodiment of the invention maps the data to the plurality of wireless channels wherein the time sensitivity information and data dependency information is used to determine the mapping.

At step 516, the present embodiment of the invention strips the data over the plurality of wireless channels. In one embodiment of the invention, the wireless channels are bursty. In this embodiment of the invention, the bursty error associated with the wireless channels is approximated and error correction is performed to reduce the error.

In one embodiment of the invention, FEC is used to correct the error. Section IIIa2 below further describes using FEC to correct the error in accordance with embodiments of the invention. In another embodiment of the invention, ARQ is used to correct the error. Section IIIa1 below further describes using ARQ to correct the error in accordance with embodiments of the present invention. In another embodiment of the invention, a hybrid error correction scheme using both FEC and ARQ is performed. Section IIIa3 below further describes a hybrid error correction in accordance with embodiments of the present invention.

(I) Forward Error Correction for Bursty Channels

As stated above, in one embodiment of the invention, error correction is implemented to reduce the packet loss over a bursty channel. For example, if the total capacity of the aggregated channels (e.g., channels 230, 232 and 234 of FIG. 3) is more than the offered load, in one embodiment of the invention, the extra channels can also be used for transmitting error correction packets. This embodiment of the invention examines how forward error correction (FEC) can be applied to the incoming data packets while striping. In particular, this embodiment of the invention concentrates on a particular systematic block code—the (n, k) Reed-Solomon code.

In one embodiment of the invention, the error corrector 310 of FIG. 3 can perform FEC or ARQ error corrections. In one embodiment of the invention, given FEC, and information from the packet loss ratio analyzer 370, the mapper 330 can determine an optimal mapping of the packets 140 over the bursty channels 230, 232 and 234.

Essentially, the striping engine 210 adds n−k parity packets to every k data packets so that the reception of any k or more packets in a block of n packets constitutes a full k data packet recovery. Reed-Solomon code is commonly used in practice for FEC error recovery systems with delay constraints. However, it is appreciated that many other forward error correction schemes are well suited to be used in accordance with embodiments of the invention.

This embodiment of the invention derives the expected packet loss ratio (PLR) $\alpha_{RS}$ after FEC has been applied to incoming traffic being transferred over a bursty channel. In one embodiment of the invention, the packet loss ratio analyzer 370 of FIG. 3 derives the expected packet loss ratio for all of the possible mappings. Embodiments of the present invention examine channel characteristics such as the packet loss ratio to improve on-time delivery of time sensitive data.

In one embodiment of the invention, the channel characteristic identifier 369 of FIG. 3 examines channel characteristics of the bursty channels 230, 232 and 234. Condition on the status of the last packet transmitted (loss/success), giving two conditional probabilities, $\alpha_{RS|1}$ and $\alpha_{RS|0}$, respectively. Thus $\alpha_{RS}$ can be expressed in terms of conditional probabilities as (wherein π is the packet loss ratio):

$$\alpha_{RS} = \pi * \alpha_{RS|1} + (1-\pi) * \alpha_{RS|0}$$

To find $\alpha_{RS|1}$, consider the k data packet block and the n−k parity packet block separately. Now condition on the status of the last data packet (k-th data packet); given the k-th data packet is lost or received, embodiments of the invention use R(m,n) or S(m,n) for probability calculation of the trailing n−k parity block. R(m,n) is the probability that there is exactly m lost packets in n packets following an observed lost packet. S(m,n) is defined as the probability of having exactly m correctly received packets in n packets following an observed correctly received packet. We can also define r(m,n) as the probability that there are exactly m loss packets in n packets between two lost packets following an observed lost packet. Finally, we can define r̄(m,n) as the probability that there are exactly m lost packets in n packets following a lost packet and preceding a successfully received packet. s(m,n) and s̄(m; n) are similarly defined counterparts to r(m,n) and r̄(m,n).

Conditioning on the event when the k-th data packet is lost, consider all cases when any number i of the remaining k−1 data packets are lost. Each case i will have a loss of $$\frac{i+1}{k},$$

assuming there are at least n−k+1 total loss packets including the n−k parity packet block. Similar analysis conditioning on the event when the k-th data packet is successfully received completes the derivation for $\alpha_{RS|1}$ which can be expressed as:

$$\alpha_{RS|1} = \sum_{i=0}^{k-1} \left(\frac{i+1}{k}\right) r(i, k-1) \sum_{j=[n-k-i]^+}^{n-k} R(j, n-k) +$$

$$\sum_{i=1}^{k-1} \left(\frac{i}{k}\right) \bar{r}(i, k-1) \sum_{j=[n-k+1-i]^+}^{n-k} S(n-k-j, n-k)$$

where [x]⁺ is the positive part of x.

Following similar analysis for $\alpha_{RS|0}$:

$$\alpha_{RS|0} = \sum_{i=0}^{k-1} \left(\frac{i+1}{k}\right) \bar{s}(k-1-i, k-1) \sum_{j=[n-k-i]^+}^{n-k} R(j, n-k) +$$

$$\sum_{i=1}^{k-1} \left(\frac{i}{k}\right) s(k-1-i, k-1) \sum_{j=[n-k+1-i]^+}^{n-k} S(n-k-j, n-k)$$

Using the derivation in the previous section, embodiments of the invention determine the effect of loss parameters on the effective PLR when data sent over a bursty channel is protected using FEC. Embodiments of the invention also compare the performance of sending data over a single bursty channel with striping it over a set of multiple channels with the same loss characteristics. One embodiment of the invention uses RS (3,2) code for FEC. As expected, irrespective of the burst length, the effective PLR increases as the raw PLR increases. It can be determined that effective PLR is also a function of the burst length. As the burst length increases, the effective PLR also increases.

Embodiments of the present invention also consider a simple case of striping the RS (3,2) encoded data over three bursty channels, each with the same raw PLR. The three FEC packets (two data packets and one parity packet) are each assigned to separate channels. Since all the FEC packets of each block are assigned to a separate channel, effective PLR for the striped FEC data is independent of the burst length. It is determined that as the raw PLR increases, the performance difference between each of the single channel FEC case and the striping FEC case becomes more pronounced.

In summary, embodiments of the invention determine that in general, striping packets across channels has similar effect as reducing the burstiness of a single channel, and hence improves the performance of FEC, which is sensitive to burstiness. Given this observation, embodiments of the invention analyze in the next section how to analyze the performance of a particular mapping for striping RS (n, k) code to a set of m bursty channels. Doing so will lead towards the goal of finding the optimal mapping for a given RS (n,k) code and a set of m channels.

(II) Striping Forward Error Correction (FEC) Data

For a given FEC code, the data packets and parity packets can be striped over a set of channels in multiple ways. In one embodiment o the invention, the mapper 330 of FIG. 3 determines the possible mappings of the data packets over the channels. The mapping of k data packets and n−k parity packets to m bursty channels is called an FEC distribution. Such a mapping can be denoted by g:(k,n−k)→(u,v),u,v∈I^m. It is essentially a mapping of two scalars to two vectors of length m, where $u_i$ ($v_i$) represents the number of data packets (parity packets) assigned to channel i by, for example, mapper 330.

In one embodiment of the invention, the total number of possible mappings of the data to be striped to the plurality of wireless channels is determined by mapper 330. To determine the number of unique mappings g's to m channels given a RS (n,k) code, first consider the number of mappings of k data packets to m channels t(m,k), assuming packets are indistinguishable. Suppose i data packets are assigned to channel 1. Then the number of unique mappings for k−i remaining packets in the remaining m−1 channels is t(m−1, k−i). Letting i range from 0 to k the following recursion is generated:

$$t(m, k) = \sum_{i=0}^{k} t(m-1, k-i)$$

The base cases are as follows:

$t(m,0)=1$ $t(m,1)=m$ $t(1,k)=1$

Given the recursive definition, it can be shown by inspection that t(m,k) is equivalent to m+k−1 chooses k.

$$t(m, k) = \binom{m+k-1}{k}$$

Together with the mappings of n−k parity packets to m channels, the total number of mappings is t(m,k)*t(m,n−k), which grows faster than exponential growth rate. For large values of m and k, exhaustively searching through all possible mappings is clearly impractical. In such cases, embodiments of the invention limit the solution set to a reasonably sized search space. Since RS (n,k) is a block code, the reassembler at the receiver has to wait for the receipt of at least k packets before it can start channel-decoding packets. Hence, the larger the value of n and k, the greater is the decoding delay. Such delay can be particularly problematic while transmitting real-time data such as a video stream. For this reason, RS codes with small n and k are often preferred for real-time streaming.

In this section, the present invention extends the derivation in the previous section and analyzes PLR of a given FEC distribution.

Let random variable X be the number of data packets unrecoverable in k data packets after a mapping g of a RS (n, k) code to m' channels. In one embodiment of the invention, the packet loss ratio analyzer 370 provides information to the mapper 330 so that the mapper 330 can determine the best mapping. Let Y and Z be the number of correctly transmitted data and parity packets, respectively. The three random variables are related as follows:

$$X = \begin{cases} k - Y & \text{if } Y + Z \leq k - 1 \\ 0 & o.w. \end{cases}$$

Further let random variables $Y_i < u_i$ and $Z_i < v_i$ be the number of data packets and parity packets correctly delivered in channel i, where:

$$Y = \sum_{i=1}^{m} Y_i, z = \sum_{i=1}^{m} Z_i$$

The derivation is simplified by analyzing the data and parity parts separately, the probability mass function (pmf) of $Y_i$ can be written as:

$$P(Y_i = j) = \pi_i R(u_i - j, u_i) + (1 - \pi_i) S(j, u_j)$$

where j=0, . . . , $u_i$. $Z_i$ can be written similarly. Since Y and Z are sums of random variables, the standard technique of using probability-generating function (pgf) can be used:

$$G_Y(\omega) = E[\omega^Y] = \sum_j P(Y = j)\omega^j$$

$$= E[\omega^{Y_1 + \ldots + Y_m}]$$

$$= E[\omega^{Y_1}] \ldots E[\omega^{Y_m}] = G_{Y_1}(\omega) \ldots G_{Y_m}(\omega)$$

Hence pgf $G_Y(w)$ is a product of pgfs $G_{Y1}(w)$ through $G_{Ym}(w)$. Then recover the pmf of Y from pgf $G_Y(w)$ using the following formula:

$$P(Y = j) = \frac{1}{j!} \frac{d^j}{d\omega^j} G_Y(\omega) \bigg|_{\omega=0}$$

The pmf of Z can be found similarly. Given pmfs of Y and Z, the pmf and then the expectation of X can be found using:

$$P(X = j) = P(Y = k - j | Z \leq j - 1)P(Z \leq j - 1)$$

$$E[X] = \sum_{j=1}^{k} jP(Y = k - j | Z \leq j - 1)P(Z \leq j - 1)$$

Denote π(g) as E[X]/k—the effective PLR given mapping g for RS (n,k) code.

(III) Delay-Sensitive Traffic Over Bandwidth-Limited Channels

Previously, the mapper 330 only used the loss ratio characteristics to determine the best mapping. In this embodiment of the invention, the mapper 330 also considers channel characteristics (e.g., bandwidth and delay of the channels determined by the channel characteristic identifier 369) and time sensitivity information of the packets to determine the best mapping which is described above for step 514 of process 500 of FIG. 5.

In one embodiment of the invention, the data input stream is data dependent traffic. The description of process 600 of FIG. 6 above describes how data dependent and time sensitive data is striped.

In one embodiment of the invention, the data input stream is data independent traffic. The description of process 700 of FIG. 7 above describes how data independent and time sensitive data is striped.

While analyzing the striping performance in the earlier sections, embodiments of the present invention assumed that the channels have unlimited bandwidth and did not consider transmission delay. This assumption does not effect the system performance for non-real-time data transfers. However, for transporting real-time streams, it is not only important for a packet to arrive at its destination, but it should also arrive before a set deadline. Thus the striping problem becomes more interesting and realistic if the bursty channels are bandwidth-limited.

It is appreciated that a deadline can be an absolute deadline, for example, the packet must arrive by 12:00 am or a deadline can be relative, for example, a packet must arrive within 10 seconds after receiving another packet.

In one embodiment of the invention, each j of m channels is modeled by a FIFO queue and transmission link pair: A queue with average service rate $\mu_j$ is connected to a transmission link of fixed delay $\Delta_j$ and Gilbert-modeled bursty loss with packet loss ratio $\pi_j = p_j/(p_j+q_j)$. At a given time, the fullness of the queue j is $I_j$. The time required to transmit a packet through queue j given current queue fullness is $(I_j+1)/\mu_j+\Delta_j$.

In one embodiment of the invention, the striping engine 210 of FIG. 3 distributes packets to m channels at average rate $$\sum_{i=1}^{m} \mu_i,$$

the maximum service rate that the set of channels can handle. Correspondingly, the incoming packets do not exceed rate $$\sum_{i=1}^{m} (1-\pi_i)\mu_i,$$

the aggregate bandwidth of the m channels. Additionally, the striping engine knows at all time the fullness $I_i$s of the m outgoing queues. In one embodiment of the invention, the striping engine can determine the fullness of the outgoing queues as it assigns the incoming packets to different channels.

(IIIa) Striping Data-Independent Traffic

The usefulness of a data packet, in this case, is not dependent on correct reception of other packets. The sources that do not use differential coding such as motion JPEG and PCM audio encoding are examples of this kind.

(IIIa1) ARQ-Based Algorithm

One embodiment of the invention determines the optimal striping algorithm considering only ARQ without FEC. In this embodiment of the invention, the look-ahead is only one packet, e.g., optimize one packet at a time with expiration time d. Let f(d'), d'=d−t, be the probability that a packet with expiration d is correctly and timely delivered to the client, where t is the time of optimization instant at the striping engine. Let $f_{ARQ}(d')$ be the probability that the same packet is correctly and timely delivered using (re) transmission.

Let $f_{ARQ}^i(d')$ be the probability that the same packet is correctly delivered on time if channel i is first used for (re)transmission. Assuming the client can errorlessly inform the striping engine of the packet loss (packet loss ratio $\pi_1$), the packet has a chance for retransmission with a tighter deadline. In one embodiment of the invention, the following is determined:

$$f(d') = \begin{cases} f_{ARQ}(d') & \text{if } d' \geq o \\ 0 & o.w. \end{cases}$$

$$f_{ARQ}(d') = \max_{i=1 \ldots m} f_{ARQ}^{(i)}(d')$$

$$f_{ARQ}^{(i)}(d') = \begin{cases} (1-\pi_i) + \pi_i f(d' - D_T^i - D_F) & \text{if } d' \geq D_T^{(i)} \\ 0 & o.w. \end{cases}$$

where $$D_T^{(i)} = \frac{l_i+1}{\mu_i} + \Delta_i$$

is the transmission delay for channel i and $D_F$ is the feedback delay for the receiver to inform the striping engine of the loss event, which is assumed to be the same for all channels.

The equation above can be solved using dynamic programming (DP), where each time $f_{ARQ}$ (d') or $f^{(i)}$ (d') is called, the optimal solution is stored in the [i, d'] entry of a DP table. This way each potentially repeated sub problem is solved only once. Assuming d' and $D_T^i+D_F$ are integers, the complexity of the equation is O(md). If they are not integers, one embodiment of the invention rounds down $d^1$ and rounds up $D_T^i+D_F$ for an approximate solution.

An interpretation of the search space of transmission strategy is that it is a decision tree representing a Markov-decision process. Each transmission decision (selecting channel i) at time t affects at a later time (delay $D_T^i+D_F$) an observation (i.e., transmission status), which spurs another decision until the final signal (transmission success) is observed. One embodiment of the invention finds the minimal cost path in such decision tree.

(IIIa2) FEC-Based Algorithm

Other embodiments of the invention determine the optimal striping algorithm considering only FEC and not ARQ. As shown in the previous section, the number of mappings of k data packets and n−k parity packets of RS(n,k) code to m channels can be quite large for reasonable n, k and m. For practical reasons, consider RS(n, n−1) code only, and given the observations developed last section in studying optimal FEC distributions, restrict the set of mappings g to m'-channel to even FEC distribution (EFD) only. Given embodiments of the invention commit to m'<m channels, embodiments of the invention assign the same number of packets to each channel, with the best quality channel receiving leftover packets to make up a total of n packets.

Mathematically, it means:

$$u_i + v_i = \left\lfloor \frac{n}{m'} \right\rfloor$$

$$u_j + v_j = n - (m'-1)\left\lfloor \frac{n}{m'} \right\rfloor$$

Where j is the best quality channel in terms of PLR $\pi_j$s. Given EFD, embodiments of the invention maximize the FEC performance by performing a water filling procedure of assigning the data packets to the better quality channels before assigning parity packets. For an example, when assigning RS (4,3) code to m'=3 channels, two data packets will be assigned to the best quality channel, one data packet to the next best quality channel, and the parity packet will be distributed to the worst quality channel.

Because RS (n, n−1) code is a block code, the receiver must wait until the first n−1 packets are received before channel decoding. Embodiments of the invention bound the delay of using FEC, given mapping function g, as the maximum delay experienced by a packet in the n-packet group:

$$D_T = \max_{i=1,\ldots,m} \left[ \frac{l_i + u_i + v_i}{\mu_i} + \Delta_i \right]$$

Let $f_{FEC}(d'_1)$, $d'_1=d_1-t$, be the probability that a packet with expiration $d_1$ is correctly and timely delivered when FEC is used. Because $f_{FEC}(d'_1)$ affects n−1 data packets, it is actually the average success probability of the first n−1 packets in the head of the incoming packet queue. Given RS(n, n−1) code, function g results in PLR $\pi(g)$. $f_{FEC}(d'_1)$ then can be written as:

$$f_{FEC}(d'_1) = \max_n \max_g \left[ \frac{1}{N-1} \sum_{i=1}^{n-1} f_n^g(d'_i) - \lambda \frac{n}{n-1} \right]$$

$$f_n^g(d'_1) = \begin{cases} (1-\pi(g)) & \text{if } d'_i \geq D_T \\ 0 & \text{o.w.} \end{cases}$$

where $f_{FEC}(d'_1)$ is optimized over a range of n in RS (n, n−1), and a set of EFD FEC mappings {g}.

There is a penalty term $$\lambda \left( \frac{n}{n-1} \right)$$

in the equation above. The reason is that using RS (n, n−1) code invariably increases the traffic volume by factor n/(n−1). Hence a penalty term is used to regulate the packet volume so that it does not lead to queue overflow. Lambda can be selected depending on the total amount of traffic currently in the m outgoing queues.

(IIIa3) Hybrid Algorithm with FEC and ARQ

Embodiments of the present invention combine the ARQ and FEC algorithms into one hybrid algorithm. $f(d'_1)$ is now simply the larger value of the two possible choices—(re)transmission or FEC:

$$f(d'_1) = \begin{cases} \max[f_{ARQ}(d'_1), f_{FEC}(d'_1)] & \text{if } d'_1 \geq 0 \\ 0 & \text{o.w.} \end{cases}$$

where $f_{FEC}(d'_1)$, is now defined recursively to permit retransmission:

$$f_{FEC}(d'_1) = \max_n \max_g \left[ \frac{1}{N-1} \sum_{i=1}^{n-1} f_n^g(d'_i) - \lambda \frac{n}{n-1} \right]$$

$$f_n^g(d'_1) = \begin{cases} (1-\pi(g)) + \pi(g)f(d'_1 - D_T - D_F) & \text{if } d'_i \geq D_T \\ 0 & \text{o.w.} \end{cases}$$

(IIIb) Striping Data Dependent Traffic

In one embodiment of the invention, in the case when the data packets are dependent, the striping engine optimizes a group of L dependent data packets at a time. Instead of the general directed acyclic graph (DAG) dependency, assume a dependency where strict ordering of data packet importance is possible, such as chain dependency. Chain dependency includes the common motion compensated group of pictures (GOP) of I and P frames used in video standards such as MPEG-1/2/4 and H.263/H.264. In such case, the objective function is:

$$f(d') = \sum_{i=1}^{L} \prod_{j=1}^{i} f(d'_j)$$

where $d'=[d'_1 \ldots d'_j]$ is a vector of length L.

Due to the interdependencies, solving the equation above directly is difficult. Instead, embodiments of the present invention rely on the optimization technique developed thus far for the independent case. Assuming a group of L data packets whose dependencies are strictly ordered, embodiments of the present invention first order packets in the input queue according to the dependencies. Embodiments of the present invention then solve $f(d_j)$ at the head of the queue, with multiplier value $\lambda(j)$ a function of relative to L: earlier in the sequence $f(d_j)$ will receive a smaller $\lambda(j)$ and hence smaller penalty term, and therefore it will have more liberty in using the available bandwidth. Packets later in the dependency chain will receive larger $\lambda(j)$ to avoid queue overflows and ensure system stability. This is done so that more resources are allocated to more important packets.

Exemplary Computer System

Figure 8:
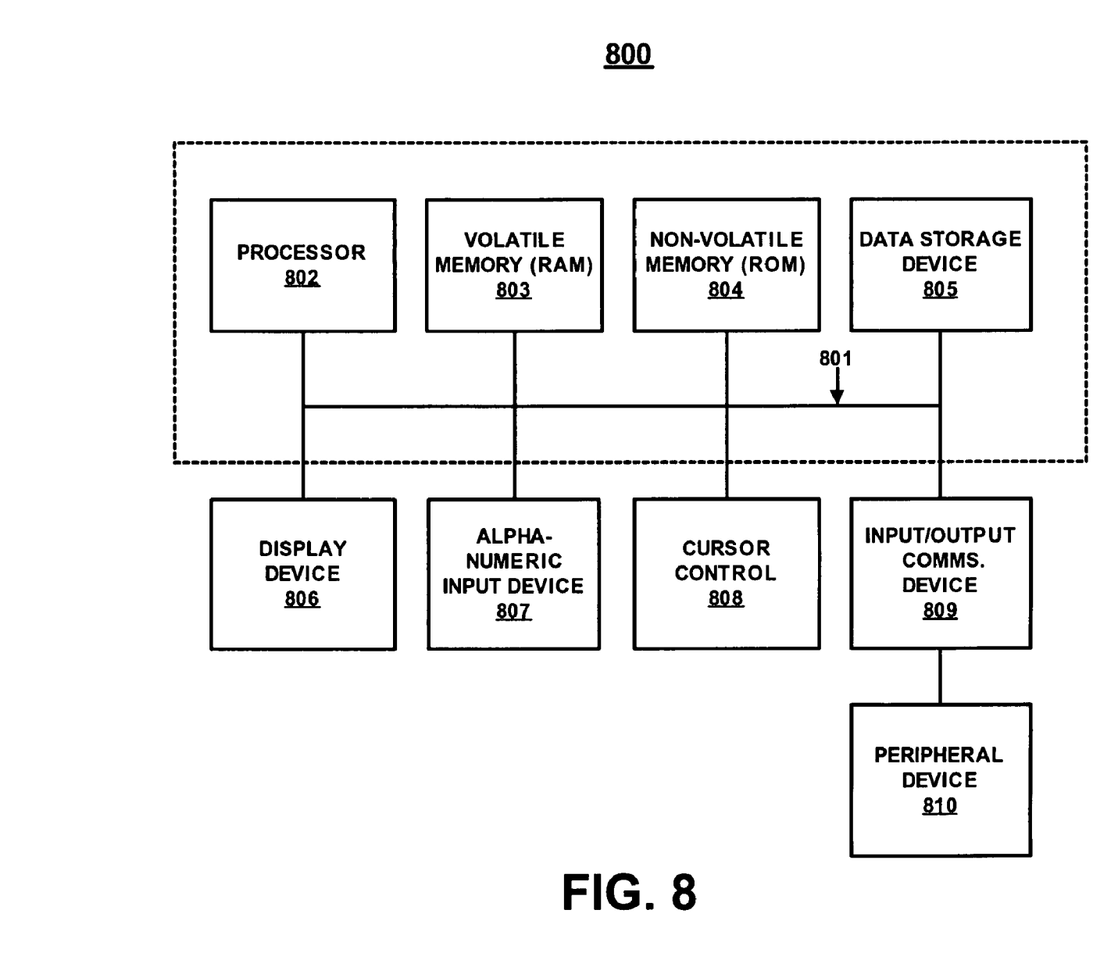
FIG. 8 is a block diagram of an exemplary computer system, which can be used as a platform for embodiments of the present invention.

With reference to FIG. 8, portions of the present invention are comprised of computer-readable and computer-executable instructions that reside, for example, in computer system 800, which may be used as a part of a general-purpose computer network (not shown). It is appreciated that computer system 800 of FIG. 8 is exemplary only and that the present invention can operate within a number of different computer systems including general-purpose computer systems, embedded computer systems, laptop computer systems, hand-held computer systems, and stand-alone computer systems.

In the present embodiment, computer system 800 includes an address/data bus 801 for conveying digital information between the various components, a central processor unit (CPU) 802 for processing the digital information and instructions, a volatile main memory 803 comprised of volatile random access memory (RAM) for storing the digital information and instructions, and a non-volatile read only memory (ROM) 804 for storing information and instructions of a more permanent nature. In addition, computer system 800 may also include a data storage device 805 (e.g., a magnetic, optical, floppy, or tape drive or the like) for storing vast amounts of data. It should be noted that the software program for outputting information of the present invention can be stored either in volatile memory 803, data storage device 805, or in an external storage device (not shown).

Devices which are optionally coupled to computer system 800 include a display device 806 for displaying information to a computer user, an alpha-numeric input device 807 (e.g., a keyboard), and a cursor control device 808 (e.g., mouse, trackball, light pen, etc.) for inputting data, selections, updates, etc. Computer system 800 can also include a mechanism for emitting an audible signal (not shown).

Furthermore, computer system 800 can include an input/output (I/O) signal unit (e.g., interface) 809 for interfacing with a peripheral device 810 (e.g., a printer, a computer network, modem, mass storage device, etc.). Accordingly, computer system 800 may be coupled in a network, such as a client/server environment, whereby a number of clients (e.g., personal computers, workstations, portable computers, minicomputers, terminals, etc.) are used to run processes for performing desired tasks (e.g., printing, outputting information, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for striping data comprising:
    accessing data to be striped over a plurality of wireless channels;
    accessing time sensitivity information associated with said data to be striped;
    determining a plurality of mappings for said data to be striped to said plurality of wireless channels wherein said time sensitivity information is used determine said plurality of mappings of said data to be striped over said plurality of wireless channels;
    determining an expected packet loss ratio for each of said plurality of mappings; and
    striping said data over said plurality of wireless channels according to one of said plurality of said mappings based on said expected packet loss ratio.

2. The method as recited in claim 1 wherein said accessing time sensitivity information associated with said data further comprises:
    determining said data to be striped comprises time sensitive data.

3. The method as recited in claim 2 wherein said accessing time sensitivity information associated with said data further comprises:
    determining said data to be striped comprises time sensitive and data dependent data.

4. The method as recited in claim 3 further comprising:
    determining said data to be striped comprises layered video streaming data or motion-compensated streaming data.

5. The method as recited in claim 2 wherein said accessing time sensitivity information associated with said data further comprises:
    determining said data to be striped comprises time sensitive and data independent data.

6. The method as recited in claim 5 further comprising:
    determining said data to be striped comprises pulse-coding modulation (PCM) streaming audio data or multiple description coding (MDC) streaming video data.

7. The method as recited in claim 1 further comprising:
    determining channel characteristics of said plurality of wireless channels.

8. A system for striping data comprising:
    an input for receiving data to be striped;
    an identifier for identifying time sensitivity information associated with said data to be striped;
    a mapper for generating a plurality of mappings of said data to be striped to a plurality of wireless channels wherein said time sensitivity information is used to determine said mappings; and
    a loss determiner for determining an expected packet loss rate for each of said plurality of mappings.

9. The system as recited in claim 8 further comprising:
    a plurality of wireless transmitters coupled to said mapper for transmitting said data over said plurality of wireless channels.

10. The system as recited in claim 8 wherein said mapper is further configured to determine channel characteristics of said plurality of wireless channels.

11. The system as recited in claim 8 further comprising:
    an error corrector for correcting a packet loss rate associated with one of said mappings.

12. The system as recited in claim 11 wherein said error corrector uses forward error correction (FEC) to reduce said packet loss rate associated with said plurality of wireless channels.

13. A computer readable medium comprising executable instructions which, when executed in a processing system, causes the system to perform the steps for a method of striping data comprising:
    accessing data to be striped over a plurality of wireless channels;
    accessing time sensitivity information associated with said data to be striped;
    determining a plurality of mappings for said data to be striped to said plurality of wireless channels wherein said time sensitivity information is used determine said mapping of said data to be striped over said plurality of wireless channels;
    determining an expected packet loss ratio for each of said plurality of mappings; and
    striping said data over said plurality of wireless channels according to one of said plurality of mappings based on said expected packet loss ratio.

14. The computer readable medium as recited in claim 13 wherein said method further comprises:
    determining channel characteristics of said plurality of wireless channels.

15. The computer readable medium as recited in claim 13 wherein said accessing time sensitivity information associated with said data further comprises:

determining said data to be striped comprises time sensitive data.

16. The computer readable medium as recited in claim 15 wherein said accessing time sensitivity information associated with said data further comprises:
   determining said data to be striped comprises time sensitive and data dependent data.

17. The computer readable medium as recited in claim 16 further comprising:
   determining said data to be striped comprises layered video streaming data or motion-compensated streaming data.

* * * * *

UNITED STATES PATENT AND TRADEMARK OFFICE
CERTIFICATE OF CORRECTION

PATENT NO. : 7,372,820 B1
APPLICATION NO. : 10/977147
DATED : May 13, 2008
INVENTOR(S) : Gene Cheung et al.

Page 1 of 1

It is certified that error appears in the above-identified patent and that said Letters Patent is hereby corrected as shown below:

Column 10, line 11, delete " $P(Y_i=j)=\pi_i R(u_i-j,u_i)+(1-\pi_i)S(j,u_i)$ "

insert -- $P(Y_i = j) = \pi_i R(u_i - j, u_i) + (1-\pi_i)S(j, u_i)$ --.

Column 13, line 1, delete "$\pi_j s$"

insert --$\pi_i s$--.

Column 14, line 6, delete " $f_n^g(d_i') = \begin{cases} (1-\pi(g)) + \pi(g)f(d_i' - D_T - D_F) & \text{if } d_i' \geq D_T \\ 0 & o.w. \end{cases}$ "

insert -- $f_n^g(d'_i) = \begin{cases} (1-\pi(g)) + \pi(g)f(d'_i - D_T - D_F) & \text{if } d'_i \geq D_T \\ 0 & o.w. \end{cases}$ --.

Column 14, line 39, after "function of" insert --j--.

Signed and Sealed this

Fifteenth Day of September, 2009

David J. Kappos
*Director of the United States Patent and Trademark Office*